UNITED STATES PATENT OFFICE.

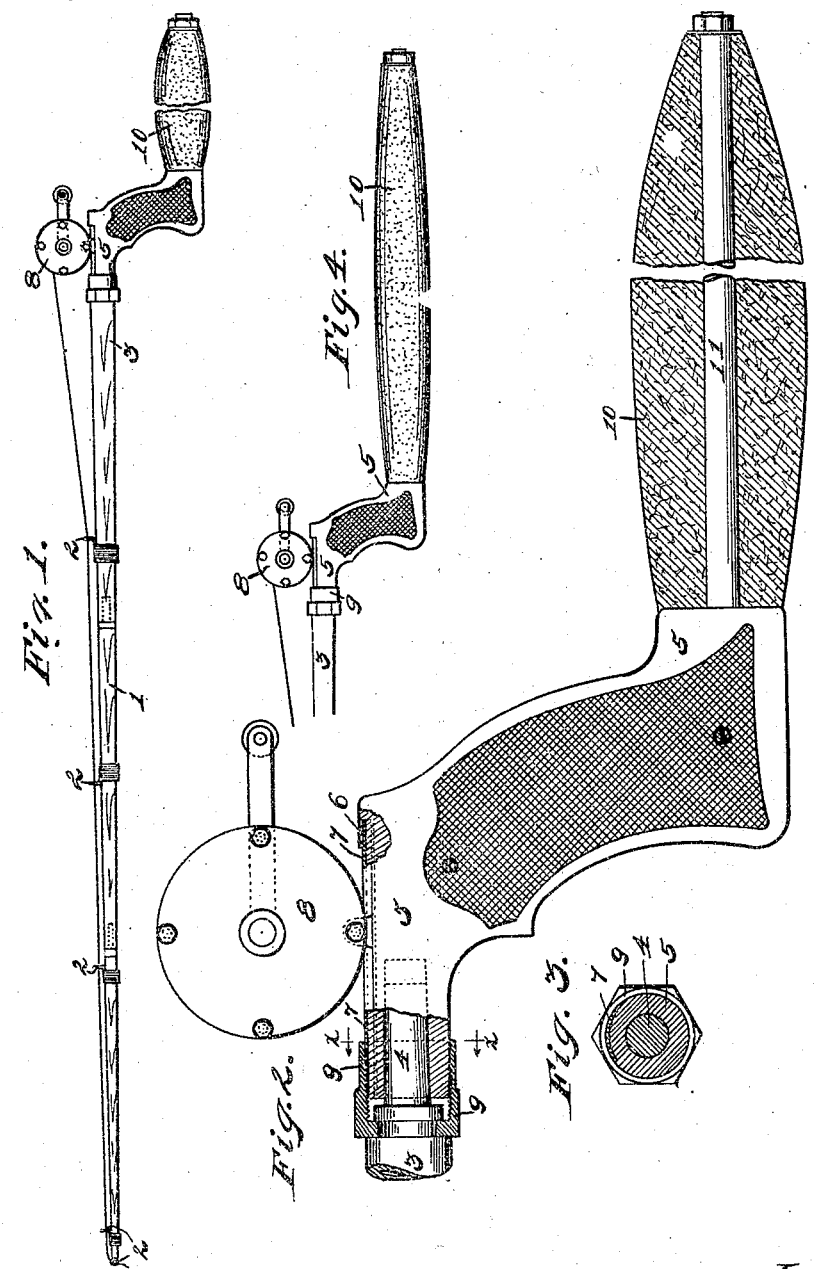

CHARLES H. HANSON, OF DES MOINES, IOWA.

FISHING-ROD.

980,942.  Specification of Letters Patent.  Patented Jan. 10, 1911.

Application filed April 11, 1910. Serial No. 554,678.

*To all whom it may concern:*

Be it known that I, CHARLES H. HANSON, a citizen of the United States, residing at Des Moines, in the county of Polk and State of Iowa, have invented certain new and useful Improvements in Fishing-Rods, of which the following is a specification.

My invention relates to improvements in fishing rods and has for its object the production of an improved fishing rod which shall be easy of manipulation and efficient in use.

The invention consists in the combination and arrangement of parts hereinafter described and claimed.

The invention will be best understood by reference to the accompanying drawings forming a part of this specification, and in which, Figure 1 is a partial side elevation of a fishing rod embodying my invention, Fig. 2, an enlarged partial sectional elevation of the handle portion of the rod, Fig. 3, a section on line $x$—$x$ of Fig. 3, and Fig. 4, a complete elevation of the handle or butt portion of the rod.

The preferred form of construction as illustrated in the drawings comprises a jointed rod 1 which may be made in any desired form and of any suitable materials, and provided with the usual guide eyes 2 for guiding the fishing line. The rear or butt joint 3 of the rod is provided with a projection or plug 4 adapted to snugly fit a corresponding recess in the handle 5. Handle 5 may be made of any suitable material and is in the form of a pistol grip, as shown. At its upper rear end handle 5 is provided with a recess 6 adapted to receive one end of the reel securing plate 7 carried by the reel 8. The other end of plate 7 is secured in position by means of a sleeve or ferrule 9 swiveled to the end of rod joint 3 and threaded into handle 5 as shown in Fig. 2.

Handle 5 also carries a supporting arm portion 10 which may be of cork or other suitable material and supported on said handle by means of stud 11.

In use, the rod is manipulated by grasping the pistol grip handle 5 which permits of manipulation of the rod with the hand in a natural position. In ordinary still fishing the supporting arm 10 is placed under the forearm of the hand grasping handle 5 and thus serves to support the rod and give leverage in handling a fish. Arm 10 may also be employed as a gripping handle when it is desired to obtain the advantage of a longer rod.

While I have illustrated and described the preferred form of construction for carrying my invention into effect this is capable of variation and modification without departing from the spirit of the invention. I therefore do not wish to be limited to the exact details set forth, but desire to avail myself of such variations and modifications as come within the scope of the appended claim.

Having described my invention what I claim as new and desire to secure by Letters Patent is:

A fishing rod comprising a handle provided with a socket; a rod joint having a plug adapted to fit said socket; a recess on said handle adapted to receive one end of a reel securing plate; and a sleeve swiveled to said rod joint and threaded on said handle, the end of said sleeve being recessed to receive the other end of said reel plate, substantially as described.

In testimony whereof I have signed my name to this specification in the presence of two subscribing witnesses.

CHARLES H. HANSON.

Witnesses:
W. G. PERRY,
R. E. PINNEY.